United States Patent [19]

Fischbeck et al.

[11] Patent Number: 4,775,232
[45] Date of Patent: Oct. 4, 1988

[54] CATADIOPTRIC PROJECTION LANTERN

[75] Inventors: Kenneth H. Fischbeck, Hanover, N.H.; Paul A. Hoisington, Norwich, Vt.

[73] Assignee: Spectra, Inc., Hanover, N.H.

[21] Appl. No.: 72,116

[22] Filed: Jul. 10, 1987

[51] Int. Cl.[4] ............................................. G03B 21/06
[52] U.S. Cl. ......................................... 353/38; 353/67
[58] Field of Search ...................... 353/38, 67, 98, 99; 350/102, 103, 452, 613

[56] References Cited

U.S. PATENT DOCUMENTS

| | | | |
|---|---|---|---|
| 1,743,834 | 1/1930 | Stimson | 350/102 |
| 3,293,982 | 12/1966 | Appeldorn | 353/38 |
| 3,401,593 | 9/1968 | Actman | 353/98 X |
| 3,525,566 | 8/1970 | Actman | 353/66 |
| 3,935,359 | 1/1976 | Rowland | 350/103 X |
| 4,526,439 | 7/1985 | Okoshi | 350/103 X |
| 4,618,518 | 10/1986 | Pricone | 350/103 X |

Primary Examiner—Harry N. Haroian
Attorney, Agent, or Firm—Brumbaugh, Graves, Donohue & Raymond

[57] ABSTRACT

In the particular embodiments described in the specification, a transparency projector includes a transparent sheet having one surface formed with a field of corner reflectors in which corresponding surfaces of each of the corner reflectors are deviated from orthogonality. A transparency adjacent to the retrodirectional reflector sheet is illuminated by a light source adjacent to a projection lens and light reflected from the retrodirectional reflector sheet back through the transparency forms images of the light source at positions on each side of the light source which are within the aperture of the projection lens. A transparency having three-dimensional ink spots which form dioptric lenticules can be projected by the transparency projection system without degradation of color.

9 Claims, 2 Drawing Sheets 4,775,232

1

CATADIOPTRIC PROJECTION LANTERN

BACKGROUND OF THE INVENTION

This invention relates to projection lanterns and, more particularly, to a new and improved catadioptric projection lantern for projecting images of transparencies on a projection screen.

Modern office copying machines are capable of producing full-size (e.g., 8.5 inch by 11.0 inch) transparencies which may then be used in an "overhead projector" to project information onto a screen during a conference or in similar situations. In such overhead projectors, the transparency is placed on an illuminated platen, which is usually disposed in a horizontal orientation, and light transmitted by the transparency is reflected through an overhead mirror to a projection lens, which in turn reproduces an enlarged image of the transparency on a projection screen. The platen upon which the transparency is placed may be lighted from beneath by a light source and condensing lens system which is often bulky and heavy in view of the large platen area to be illuminated. Alternatively, to reduce the overall bulk and weight of the projection lantern, the light source may be in the overhead portion of the projector, and a reflecting Fresnel lens is mounted in the platen on which the transparency is placed.

When transparencies are made with certain types of ink, such as "hot melt" inks used in thermal transfer printers and certain ink jet printers, the inks do not penetrate into the transparency substrate but adhere to the surface of the substrate and retain a three-dimensional form. Thus, hot melt inks which are solid at room temperature and are liquefied by heating for application and then resolidified by freezing on the substrate are distinct from solvent-based inks which dry by evaporation or absorption and leave only a microscopically thin residue on the surface of the substrate. When such three-dimensional ink spots are formed on a transparency substrate, they refract the light transmitted through them in the manner of a dioptric lenticule. As a result, transparencies made with such inks disperse light passing through the ink spots so that most of it is not collected by the projection lens, producing gray shadows rather than colored images when projected by conventional projection lanterns.

SUMMARY OF THE INVENTION

Accordingly, it is an object of the present invention to provide a new and improved projection lantern which overcomes the above-mentioned disadvantages of conventional projection lanterns.

Another object of the invention is to provide a projection lantern having a compact structure which is convenient for use and compact for storage or transportation.

A further object of the invention is to provide a projection lantern especially adapted to produce images of transparencies containing three-dimensional ink spots without degradation of the image.

These and other objects of the invention are attained by providing a projection lantern including a retroreflective element for illuminating the transparency. In accordance with a particular embodiment of the invention, a retroreflective element is formed with an array of deviating corner reflectors arranged to return incident light in a direction deviating by a small angle from the direction of incidence of the light. An illuminating light source and projection lens are positioned on the same side of the transparency, separated by an angle corresponding to the deviation angle so that light projected toward the transparency from the light source is reflected back through the transparency toward the projection lens.

For optimum efficiency, the projection lens may include two portions disposed on opposite sides of the light source to collect light deviated at opposite angles by the retroreflective element.

A retroreflective element providing the advantages of the invention is prepared by forming a mold master designed to produce an array of retroreflective corner elements, each having corresponding surface deviating from 90° by a small angle, and using the mold to form a transparent plastic sheet having an array of reflective internal corner elements on one surface.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
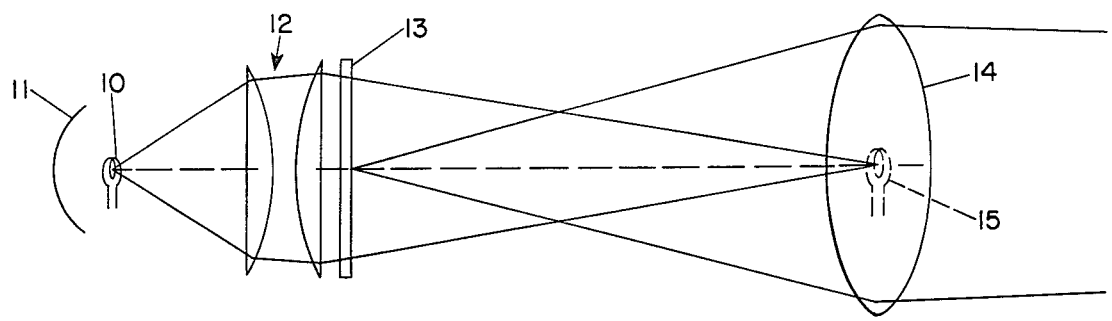
FIG. 1 is a fragmentary schematic diagram illustrating the arrangement of a conventional projection lantern.

In the conventional projection lantern illustrated schematically in FIG. 1, a light source 10 provided with a reflector 11 projects light through a condenser lens system 12 so as to provide uniform, substantially parallel illumination of a transparency 13 which is to be imaged by a projection lens 14 on a remote screen (not shown). In overhead-type projectors, a 45° mirror is interposed between the transparency 13 and the projection lens 14 so that the transparency can be disposed in a horizontal position, but for convenience of illustration the mirror is not shown in FIG. 1. In such projection lanterns, the condenser lens system is designed to project an image 15 of the light source 10 substantially in the plane of the projection lens 14 for optimum efficiency of the system. Moreover, to provide maximum illumination of the transparency 13 in a uniform manner, the condenser lens system 12 must be large and bulky even if a portion of that system incorporates a Fresnel lens.

Figure 2:
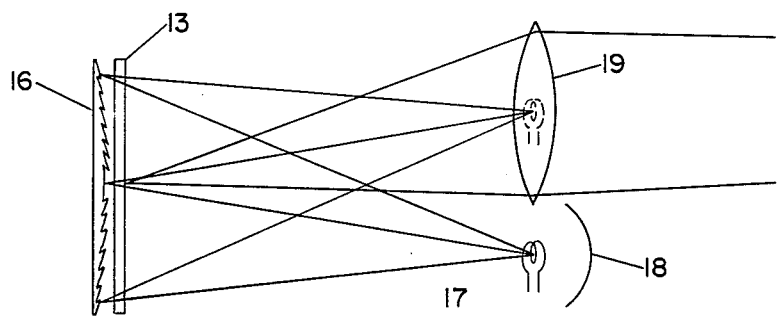
FIG. 2 is a fragmentary schematic diagram illustrating the arrangement of the illuminating system for a conventional reflection projection lantern.

To eliminate the necessity for a bulky illumination system adjacent to the transparency, reflection-type systems of the type shown in FIG. 2 have been used. In this case, a reflecting Fresnel lens 16 is mounted immediately behind the transparency 13 and a light source 17 and an accompanying mirror 18 are disposed adjacent to the projection lens 19 so that the reflective Fresnel lens 16 images the light source substantially in the plane of the projection lens 19. In this case, as shown in FIG. 2, light from the source 17 passes through the transparency 13 at slightly displaced positions in its passage to and from the reflecting Fresnel lens 16 so that the illumination of the transparency may be affected by the image on the transparency.

Figure 3:
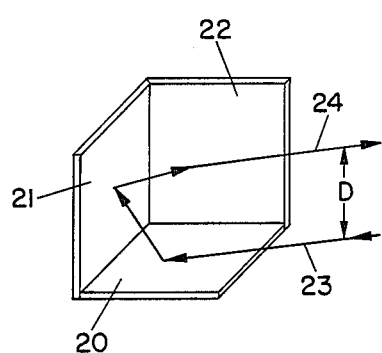
FIG. 3 is a schematic diagram illustrating the displacement of a ray reflected retrodirectionally by a corner reflector.

A retroreflector is a device which reflects a ray of light back in the same direction from which it came. Retroreflectors can be made by providing lenses with reflective focal surfaces or by arranging three planar reflecting surfaces in mutually orthogonal relation to form a corner producing a "corner reflector". With a corner reflector, any ray of light reflected successively from all three surfaces is exactly reversed in direction, although slightly displaced. As shown in FIG. 3, for example, a corner reflector comprising three mutually orthogonal reflecting surfaces 20, 21 and 22 receives a ray 23 which is reflected successively by the surfaces 20, 21 and 22 so that it returns as a ray 24 parallel to the incident ray 23 but displaced by a distance D from that ray.

Figure 4:
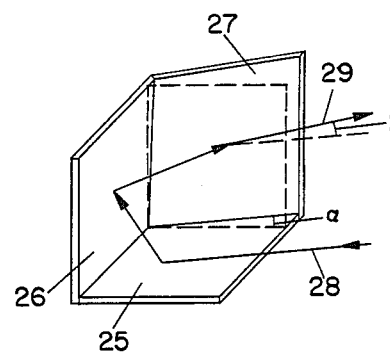
FIG. 4 is a schematic diagram illustrating the deviation of a reflected ray from a deviated corner reflector.

If the corner reflector is designed so that the angle between one of the reflecting surfaces and the other surfaces is slightly different from 90°, the emerging ray will no longer be parallel to the incident ray, but will in all cases be deviated by an angle equal to twice the difference between the angle between the surfaces and 90°. This is illustrated in FIG. 4 in which the reflective surfaces 25 and 26 are at right angles, but the reflective surface 27 is disposed at an angle of 90° plus $\alpha$ from each of the other surfaces. In this case, an incident ray 28 is reflected successively by the surfaces 25, 26 and 27 so that the emerging ray 29 diverges by an angle of $2\alpha$ from a direction parallel to the incident ray 28, the angle of divergence being measured in the plane of the incident and emerging rays.

Figure 5:
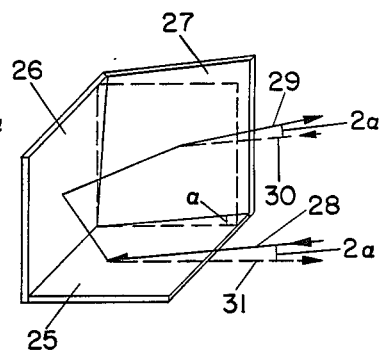
FIG. 5 is a schematic diagram showing the deviation of parallel incident rays in both directions by a deviated corner reflector.

Furthermore, the direction of the deviation of the emergent ray is dependent upon the order in which the rays strike the surfaces separated by the deviating angle. As shown in FIG. 5, for example, an incident ray 30, parallel to the incident ray 28, which strikes the surface 27 first and is then reflected by the surfaces 26 and 25 will emerge as a ray 31 inclined at an angle $2\alpha$ in the direction way from the incident ray 30.

It is apparent, of course, that an array or field of adjacent corner reflectors covering a relatively large area will retroreflect light from a source which is spaced from the array in lines converging at the light source, thus focusing light from the light source back onto itself. Similarly, an array of deviated corner reflectors will retroreflect light from a light source spaced from the array so that it is focused at positions spaced on opposite sides of the light source by twice the angle of deviation of the deviated corner reflectors in the array. In this case, the retroreflectors in the array must be oriented so that all of the corresponding reflective surfaces are parallel to each other, thereby maintaining the direction of deviation and the orientation of the deviation angle uniform.

Figure 6:
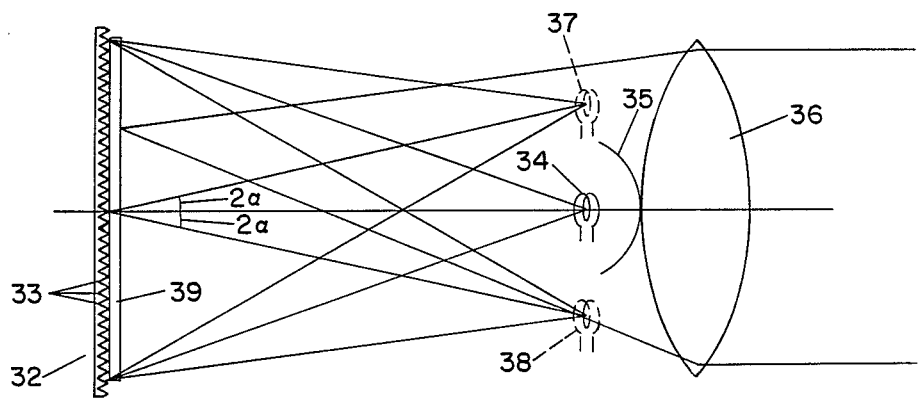
FIG. 6 is a schematic diagram showing the arrangement of an illuminating system for a projection lantern using a deviated corner retroreflective element in accordance with an embodiment of the invention.

The result of such arrangement of an array of deviated corner reflectors is illustrated in FIG. 6 in which a retroreflective element 32 comprises a transparent sheet with an array of corner reflectors 33 formed in one surface. In this case, each corner reflector has one surface disposed at an angle which is greater than 90° from the other reflective surfaces by the angle $\alpha$ in the manner shown in FIGS. 4 and 5. With this arrangement, a light source 34 with a reflector 35 disposed immediately in front of a projection lens 36 will be imaged by the retroreflector element 32 at two locations, 37 and 38, which are separated from the source 34 by angles $2\alpha$ as seen from the retroreflective element 32. If the light source images 37 and 38 are located at positions within the aperture of the projection lens 36, as illustrated in FIG. 6, the reflected light will be substantially entirely transmitted to the projection screen to reproduce an image of a transparency 39 disposed in front of the retroreflective element 32.

Thus, if the angle of deviation of the deviated surfaces of the corner reflectors is 3°, the angle of deviation of the light source images 37 and 38 from the light source 34 is 6°, and if the light source is 15 inches from the retroreflective element 32, the images 37 and 38 will be spaced approximately 1.5 inches from the light source so as to be within the aperture of a 3-inch lens. Preferably, the angle of deviation $\alpha$ of the corner elements is between about 1° and about 5°.

If desired, the unitary projection lens 36 shown in FIG. 6 may, of course, be replaced by a composite projection lens having effective portions surrounding the light source 34 and coinciding with the images 37 and 38. For example, the lens may have a central aperture in which the light source is mounted and a surrounding reflective surface may be formed in the lens element to replace the reflector 35. In any case, of course, a 45° mirror may be interposed in the light path between the transparency 39 and the light source 34 and projection lens 36 to provide an overhead-type projector.

With this arrangement, an efficient and convenient projection lantern is provided without requiring any light source adjacent to the transparency to be projected, and necessitating only a light-weight combined illumination and projection lens element supported, together with a 45° mirror, by a single tripod arrangement. Since the retroreflective element 32 may be made of a plastic material and need only be placed in position underneath the transparency being projected, the entire system may conveniently be packaged in compact form for transportation or storage.

Furthermore, the unique catadioptric projection lantern of the invention eliminates the problems heretofore encountered in projecting transparencies made with inks such as hot melt inks which produce three-dimensional spots on the surface of a transparency. Such spots have substantially spherical surfaces and act dioptrically in the manner of a small highspeed plano-spherical lens having, for example, a diameter of about 4 mils and a focal length between about 5 mils and about 10 mils. Thus, the lenticules have an f/number between about 1.25 and 2.5.

Figure 7:
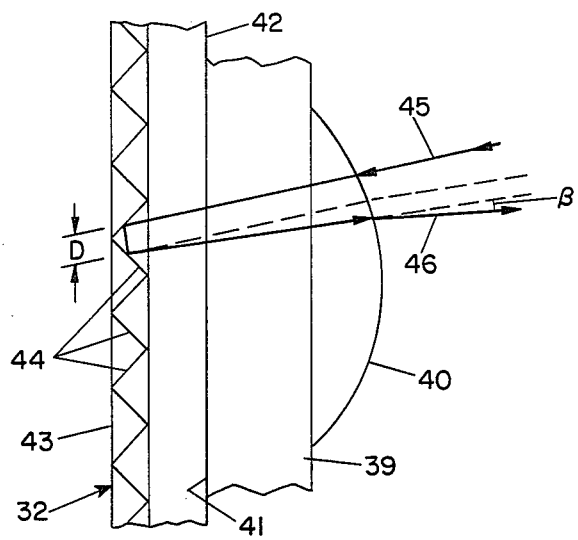
FIG. 7 is an enlarged fragmentary schematic diagram showing a portion of the retroreflective element and transparency of FIG. 6 and illustrating the angular shift in a ray incident on a dioptric lenticule reflected by a retroreflective element because of ray displacement in the retroreflector.

As shown in the enlarged view of FIG. 7, the transparency 39 has such a three-dimensional ink spot 40 providing a dioptric lenticule. The rear surface 41 of the transparency is in contact with the front surface 42 of the retroreflector element 32 which has a rear surface 43 formed with internal deviated corner elements 44 which are metallized to provide internal retroreflection of rays entering the surface 42. Thus, each ray 45 entering the surface 42 will be internally reflected within one of the corner elements 44 and returned along a path 46 which is displaced from the path of the ray 45 by a distance D, which will be no more than the maximum dimension of each corner element as viewed from the direction of the incoming ray. Thus, if the maximum dimension of the corner element is one mil, all returning rays 46 will be displaced by no more than one mil from the corresponding incoming ray 45. Preferably, the maximum diversion of the corner reflectors is no greater than about one-fifth the diameter of the dioptric lenticules.

A retroreflective projection lantern in accordance with the invention has less stringent registration requirements than a reflective Fresnel lens type projector of the type shown in FIG. 2. In the Fresnel lens type projector, the quality of the image projected by the lens 19 is not directly sensitive to the distance between the transparency 13 and the reflecting Fresnel lens 16, but, in either type of projector, the transparency must be kept relatively flat since the image is to be projected onto a flat surface and projection lanterns have a relatively small depth of field.

In the retroreflective type projector, it is important to keep the separation between the transparency 39 and the corner reflectors 44 small. Because this type of device relies on ray tracing, it is important to insure that the light returned from the corner reflector passes through the ink spot 40 close to its initial point of entry. In an idealized retroreflective projector, the corner reflectors 44 would be infinitesimally small and would return each ray of light directly along its initial path. This would cause the ray to be refracted through the ink spot lens and directly back to the source. If it were possible to position the projection lens 36 along the same path as the source, then this light could be projected onto the viewing screen.

In a practical retroreflective projector, it is necessary to separate the paths of the source and the operative projection lens segments. This is achieved by the deviated corner reflector which deviates each returned ray from the corresponding incoming ray by the angle 2α in the plane in which the reflector is deviated. Also, in a practical projector the corner reflectors are of finite size and the returned ray is displaced from the incoming ray by a distance D which depends on the point of incidence on the corner reflector. D can have any value from zero, if it encounters the center of the reflector, up to the maximum dimension of the corner reflector 44.

Both of these effects cause the reflected ray 46 to pass through a different region of the ink spot 40 than the entering ray 45. In order to obtain good color quality, it is necessary to maintain high photometric efficiency. This is achieved if the reflected ray 46 emerges from the ink spot 40 in a direction which is close to being parallel to the direction of the entering ray 45. It is also important that the reflected ray 46 not be displaced by an amount which causes it to miss the ink spot 40 through which the incoming ray 45 passed. These conditions can be achieved with high efficiency if the deviation angle α of the corner reflectors 44 is about 5°, the reflector size is about 1 mil, and the separation between the transparency image and reflectors is less than about 10 mils.

Now consider what happens if the reflector 16 (FIG. 2) or 32 (FIG. 6) is translated along the plane of the transparency. In the Fresnel type projector, the center of the reflecting lens 16 is being displaced which causes the image of the source 17 to miss the projection lens 19. In the retroreflective type projector, there is no such center and no loss of efficiency occurs. In other words, the efficiency of the projection lantern of the invention is not sensitive to the lateral positioning of the retroreflective element 32.

Similarly, if the 45° projection mirror or related optics are rotated in a plane orthogonal to the image plane, the reflection Fresnel type projector loses efficiency because the position of the light source image is sensitive to such rotations while the retroreflective type projector is insensitive to such rotations.

In either type of projector, the distance from the transparency to the projection lens determines the focal plane of the projected image. An adjustment must be provided for this so that the projector may be placed at different positions from the projection screen and different projected sizes may be obtained.

If the retroreflective projector uses an angularly segmented projection lens with segments positioned at the locations of the light source images 37 and 38 (FIG. 6), rather than an angularly continuous lens such as the lens 36 shown in FIG. 6 or a lens with a central aperture for the light source, rotation of the retroreflective element causes the projected source images 37 and 38 to rotate, and as a result the images can miss the projection lens segments.

Figure 8:
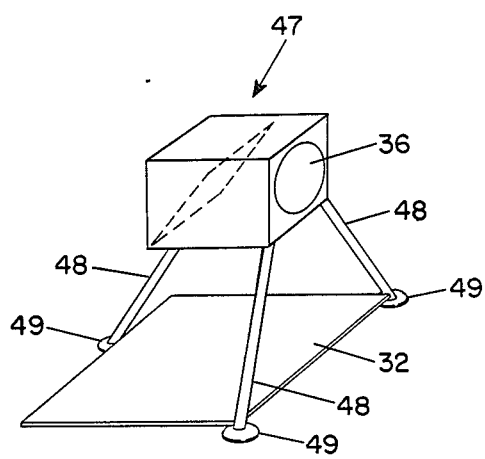
FIG. 8 is a schematic perspective view illustrating a convenient and compact projection lantern arranged according to the invention.

This single degree of freedom to which the retroreflective type projector may be sensitive can easily be controlled by using the simple tripod mounting arrangement shown in FIG. 8. In this arrangement, the orientation of the retroreflective element is fixed with respect to the orientation of a projection lens holder 47 which contains the projection lens 36 with appropriate focusing controls, the light source with condensing lens arrangement, and an internal 45° mirror. This is accomplished by providing a collapsible or removable tripod support comprising three legs 48 and providing three receptacles 49 for the tripod legs which are keyed to the orientation of the deviated corner reflectors in the retroreflective element 32. For this purpose, the receptacles 49 may be integrally formed at two corners and an opposite side of the retroreflective element. As a result, such a projector can avoid any orientation sensitivity and, at the same time, can be made more portable than a Fresnel type projector.

Because of the displacement D between the incident and reflected rays, the returning rays 46 may be deviated by a small angle β because they pass through a different portion of the lenticule 40 as shown in FIG. 7. Assuming a one mil maximum displacement D and a focal length f for the lenticule 40 of 10 mils, the angle β is determined by the following relation:

$$\tan \beta = D/f = 0.1$$

so that $\beta$, the maximum angle of dispersion of parallel incoming rays, is 5.7°. Accordingly, if the lens 36 in FIG. 6 is large enough to subtend an angle of at least 5.7° as seen from the transparency 39, substantially all of the light dispersed by the lenticules 40 in the transparency will be collected by the projection lens and the image of the transparency will be projected in full color without degradation. Consequently, a projection lens 36 having a diameter of 2 inches will collect all light from lenticules in a transparency positioned 20 inches from the projection lens. If the lenticules 40 have a shorter focal length, such as 5 mils, the maximum dispersion of parallel rays resulting from the ray displacement D will be larger, but a projection lens having a correspondingly larger aperture of, for example, 3 inches, will permit collection and projection of substantially all of the light transmitted through the dioptric lenticules of the transparency.

Thus by positioning a retroreflective element substantially in the focal plane of the dioptric lenticules of a transparency having three-dimensional ink spots, each ray incident from the light source on each ink spot is transmitted to the retroreflective element at an angle dependent upon its direction and location of incidence on the ink spot. The incident ray is then reflected by the retroreflective element and returned at an angle deviating from the incident ray by $2\alpha$ or about 6° in the example described above from the direction of the incident ray.

As previously explained, the maximum angular dispersion of the returning rays, because of the ray displacement D in the retroreflector, will be approximately 5.7° for a lenticule having a focal length of 10 mils. Light from a point source thus results in a 5.7° cone of light returned after passage in both directions through a lenticule and reflection by a one-mil corner retroreflector. Thus, the retroreflector compensates for refraction of light by the dioptric lenticules formed by the three-dimensional ink spots, effectively preventing wide dispersion and loss of the illuminating light which would occur if the spots were illuminated uniformly from behind the transparency.

Figure 9:
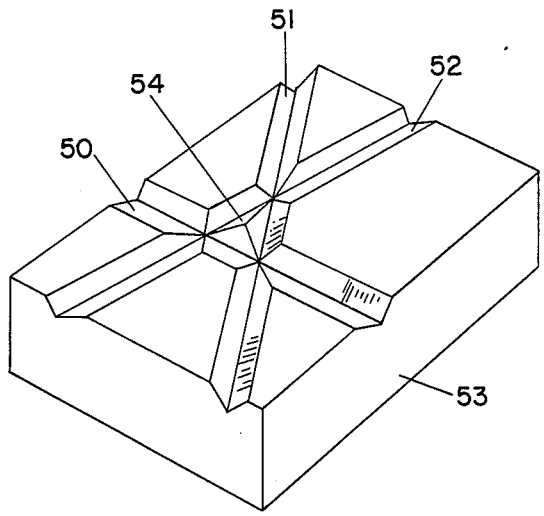
FIG. 9 is an enlarged fragmentary schematic view illustrating the fabrication of a mold master used in the preparation of a retroreflective element in accordance with the invention.

To prepare a deviated retroreflective element in accordance with the invention, a mold master may be cut with three rows of grooves extending at angles of 60° with respect to each other. One set of three such grooves, 50, 51 and 52, formed in a master 53 is illustrated in FIG. 9. The center lines of the grooves shown in FIG. 9 extend at angles of 60° with respect to each other. By making cuts with a 70.529° tool for two of the grooves and a cut for the third groove with a 70.529° plus $\alpha$ tool, a corner 54 is formed with two surfaces extending at 90° with respect to each other, and a third surface extending at 90° plus $\alpha$ with respect to the other two surfaces. Repeated parallel cuts made in this manner, forming a pattern of the type shown in FIG. 10, produces a mold having identical projecting corners, each having a corresponding surface deviated from orthogonal relationship to the other surfaces by an angle $\alpha$.

Figure 10:
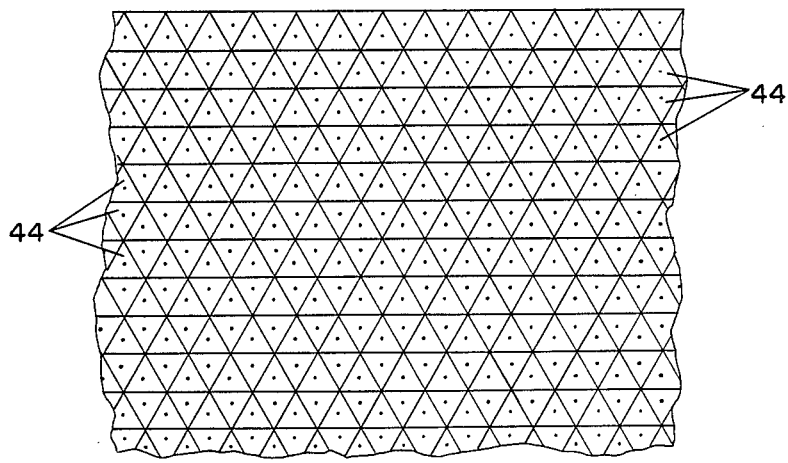
FIG. 10 is an enlarged plan view illustrating schematically the arrangement of corner reflectors in a retroreflective element according to the invention.

Using a master mold of the type illustrated in FIG. 10, a large number of "mother" patches with mating surfaces having indented corners may be electroformed on the surface of the master and a complete field or array of deviated retroreflectors is constructed by assembling such mother patches in proper orientation in a chase, so that all of the corresponding surfaces of the corner elements are parallel to each other. A "daughter" field with projecting corners is then electroformed on the field consisting of "mother" patches, and the final mold having indented corners is electroformed on the surface of the "daughter" field thereafter. A transparent molded plastic sheet having projecting corner elements is formed in any conventional way from the final mold and the surface containing the projecting corners is metallized to produce a field of deviated retroreflective corners so as to provide the retroreflective element 32 shown in FIG. 6 and FIG. 7.

Although the invention has been described herein with reference to specific embodiments, many modifications and variations therein will readily occur to those skilled in the art. Accordingly, all such variations and modifications are included within the intended scope of the invention as defined by the following claims.

We claim:

1. A transparency projector comprising light source means, retroreflective means spaced from the light source means to reflect light received from the light source means through an adjacent transparency back through the transparency generally toward the light source means, projection lens means adjacent to the light source means for projecting an image of a transparency disposed adjacent to the retroreflective means, and transparency means disposed adjacent to the retroreflector means having dioptric lenticules on one surface thereof wherein the retroreflective means has a retroreflective surface positioned proximate to the plane of the dioptric lenticules.

2. A transparency projector according to claim 1 wherein the retroreflector means comprises a sheet formed with a plurality of corner reflectors.

3. A transparency projector according to claim 2 wherein the corner reflectors have one surface which deviates by a small angle from orthogonal relationship with the other surfaces.

4. A transparency projector according to claim 3 wherein the retroreflector means produces images of the light source means on opposite sides of the light source means at positions within the aperture of the projection lens means.

5. A transparency projector according to claim 4 wherein the deviation angle of the surfaces of the corner reflectors is between 1° and 5°.

6. A transparency projector according to claim 4 wherein the images of the light source means are within a 3-inch aperture of the projection lens means.

7. A transparency projector according to claim 1 wherein the retroreflective surface of the retroreflector means includes a field of corner reflectors in which each corner reflector has a maximum dimension substantially less than the diameter of the dioptric lenticules of the transparency.

8. A transparency projector accordingly to claim 7 in which the maximum dimension of the corner reflectors is no more than about one-fifth the diameter of the dioptric lenticules of the transparency.

9. A transparency projector according to claim 1 wherein the retroreflector means includes a field of corner reflectors wherein one surface of each of the corner reflectors deviates from an orthogonal relationship to the other surfaces by an angle between about 1° and about 5°.

* * * * *